(12) United States Patent
Choi et al.

(10) Patent No.: US 8,374,346 B2
(45) Date of Patent: Feb. 12, 2013

(54) METHOD, APPARATUS, AND SYSTEM FOR PRE-AUTHENTICATION AND KEEP-AUTHENTICATION OF CONTENT PROTECTED PORTS

(75) Inventors: Hoon Choi, Mountain View, CA (US);
Daekyeung Kim, San Jose, CA (US);
Wooseung Yang, Santa Clara, CA (US);
Gyudong Kim, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 911 days.

(21) Appl. No.: 12/351,698

(22) Filed: Jan. 9, 2009

(65) Prior Publication Data

US 2010/0177892 A1 Jul. 15, 2010

(51) Int. Cl.
*H04N 7/167* (2006.01)
(52) U.S. Cl. .......................................... 380/201; 726/27
(58) Field of Classification Search .................. 726/2, 5, 726/11, 26, 27, 29; 380/210–212; 713/168–171; 370/498, 503, 507, 512; 725/25, 27, 31
See application file for complete search history.

(56) References Cited

U.S. PATENT DOCUMENTS

| | | | | |
|---|---|---|---|---|
| 7,283,566 | B2* | 10/2007 | Siemens et al. | 370/486 |
| 7,398,547 | B2* | 7/2008 | deCarmo | 726/3 |
| 7,412,053 | B1* | 8/2008 | Lyle | 380/2 |
| 7,797,536 | B1* | 9/2010 | Lyle | 713/168 |
| 2004/0123119 | A1 | 6/2004 | Buer et al. | |
| 2006/0269056 | A1* | 11/2006 | Montag | 380/205 |
| 2008/0159532 | A1* | 7/2008 | Verma | 380/210 |
| 2008/0165289 | A1 | 7/2008 | Furtani | |
| 2008/0186403 | A1* | 8/2008 | Douillet | 348/461 |
| 2008/0307496 | A1* | 12/2008 | Kurose | 726/2 |
| 2010/0005289 | A1* | 1/2010 | Devanand et al. | 713/155 |

OTHER PUBLICATIONS

"High-bandwidth Digital Content Protection System", *Digital Content Protection LLC, Revision 1.3*, (Dec. 21, 2006), pp. 1-90.
International Search Report and Written Opinion, International Application No. PCT/US2009/069870. (Apr. 12, 2010), 11 pages.
International Preliminary Report on Patentability for International Patent Application No. PCT/US2009/069870, Mailed Jul. 21, 2011, 6 pages.

* cited by examiner

*Primary Examiner* — Gilberto Barron, Jr.
*Assistant Examiner* — Abdulhakim Nobahar
(74) *Attorney, Agent, or Firm* — Blakely, Sokoloff, Taylor & Zafman

(57) ABSTRACT

A method, apparatus and system for providing pre-authentication and keep-authentication of content protected ports system employing a ratio of one decipher processing engine (e.g., HDCP engine) associated with multiple ports is disclosed is disclosed. In one embodiment, a receiving device is pre-authenticated by a transmitting device, wherein the receiving device to receive a data stream from the transmitting device via a first data path. Further, a first High-Definition Content Protection (HDCP) engine is associated with a first port in the first data path, the first HDCP engine coupled with a second HDCP engine. The second HDCP engine is associated with a plurality of ports in a second data path, each of the plurality of ports associated with a memory pipe having state information relating to each of the plurality of ports, the state information being used to pre-authenticate the receiving device.

12 Claims, 6 Drawing Sheets

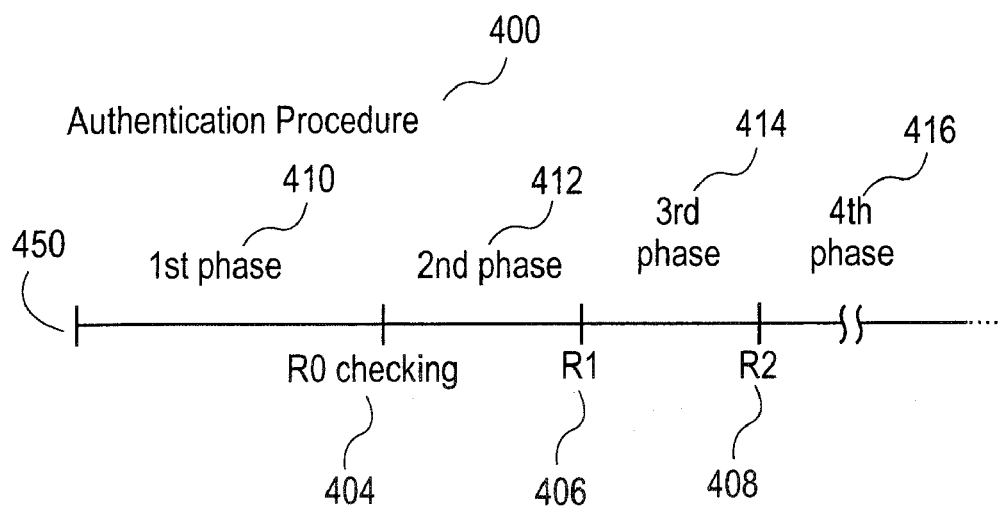
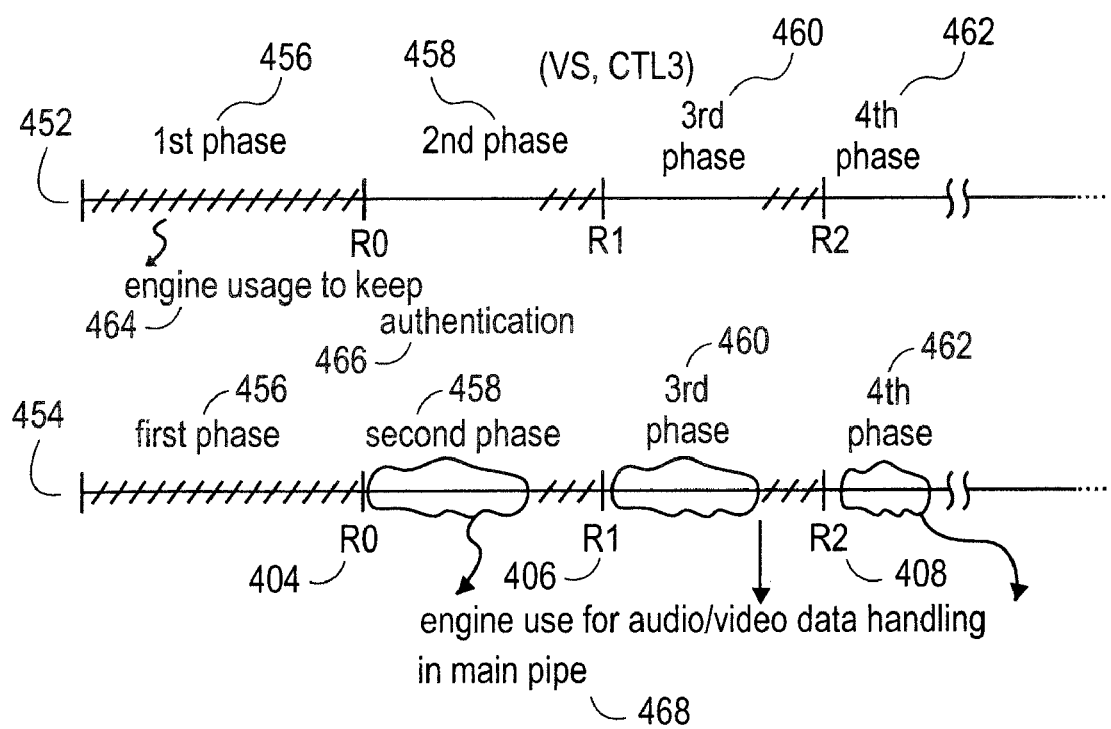
FIG. 4

METHOD, APPARATUS, AND SYSTEM FOR PRE-AUTHENTICATION AND KEEP-AUTHENTICATION OF CONTENT PROTECTED PORTS

FIELD

Embodiments of the invention generally relate to the field of networks and, more particularly, to pre-authentication and keep-authentication of content protected ports.

BACKGROUND

In the operation of a system that utilizes multiple data streams, such as multiple media data streams for display. The data may include data protected by High-bandwidth Digital Content Protection (HDCP) data, which is referred to herein as HDCP data. Thus, a system may result multiple encoded streams that require deciphering. However, the process of deciphering HDCP can be time consuming. This generally results in a delay before the data may be viewed or heard, thereby interfering with the use and enjoyment of a system.

HDCP is a content protection protocol that is used to protect media content, particularly premium media content. For example, when there is flow of content between transmitting device (e.g., a DVD player) and a receiving device (e.g., a television) via the High-Definition Multimedia Interface (HDMI) interface, the premium media content flowing is to be protected, such as the receiving device is validated and authenticated before receiving such media content from the transmitting device, while the transmitting device is validated and authenticated before the receiving the device accepts its content. This validation and authentication of the two devices is performed by exchanging some initial verification data (e.g., public/private keys), which may last less than a second or two.

Each time there is change in the connection, such as the change in connection ports, media content, etc, a new validation/authentication process is run. For example, if the receiving device is now connected to another transmitting device (e.g., digital camera), these two devices are now validated and authenticated before the protected media content can be communicated between them. This process is cumbersome and time-consuming and wastes valuable resources. It was, therefore, pre-authentication of the ports was introduced. The pre-authentication process pre-authorizes all the ports, eliminating the need to run an authentication process each time a port is changed. However, having assigned one decipher processing engine to each port means whenever the number of ports is increased, an equal number of decipher processing engines are to be added, resulting in the increase of area.

It is, therefore, desirable to have a single decipher processing engine associated with multiple ports.

SUMMARY

A method, apparatus, and system for pre-authentication and keep-authentication of content protected ports system employing a ratio of one decipher processing engine (e.g., HDCP engine) associated with multiple ports is disclosed.

In one embodiment, a method includes pre-authenticating a receiving device by a transmitting device, wherein the receiving device to receive a data stream from the transmitting device via a first data path, associating a first High-Definition Content Protection (HDCP) engine with a first port in the first data path, the first HDCP engine coupled with a second HDCP engine, and associating the second HDCP engine with a plurality of ports in a second data path, each of the plurality of ports associated with a memory pipe having state information relating to each of the plurality of ports, the state information being used to pre-authenticate the receiving device.

In one embodiment, an apparatus includes a receiving device to be pre-authenticated by a transmitting device, wherein the receiving device to receive a data stream from the transmitting device via a first data path. Further, a first High-Definition Content Protection (HDCP) engine is associated with a first port in the first data path, the first HDCP engine coupled with a second HDCP engine. The second HDCP engine is associated with a plurality of ports in a second data path, each of the plurality of ports associated with a memory pipe having state information relating to each of the plurality of ports, the state information being used to pre-authenticate the receiving device.

In one embodiment, a system including a pre-authenticating device to facilitate pre-authenticating of a receiving device by a transmitting device, wherein the receiving device to receive a data stream from the transmitting device via a first data path, the pre-authenticating device includes a first High-Definition Content Protection (HDCP) engine is associated with a first port in the first data path, the first HDCP engine coupled with a second HDCP engine, and the second HDCP engine is associated with a plurality of ports in a second data path, each of the plurality of ports associated with a memory pipe having state information relating to each of the plurality of ports, the state information being used to pre-authenticate the receiving device.

BRIEF DESCRIPTION OF THE DRAWINGS

Embodiments of the invention are illustrated by way of example, and not by way of limitation, in the figures of the accompanying drawings in which like reference numerals refer to similar elements:

FIG. 4 illustrates an embodiment of a transaction sequence of an authentication process;

DETAILED DESCRIPTION

Figure 1:
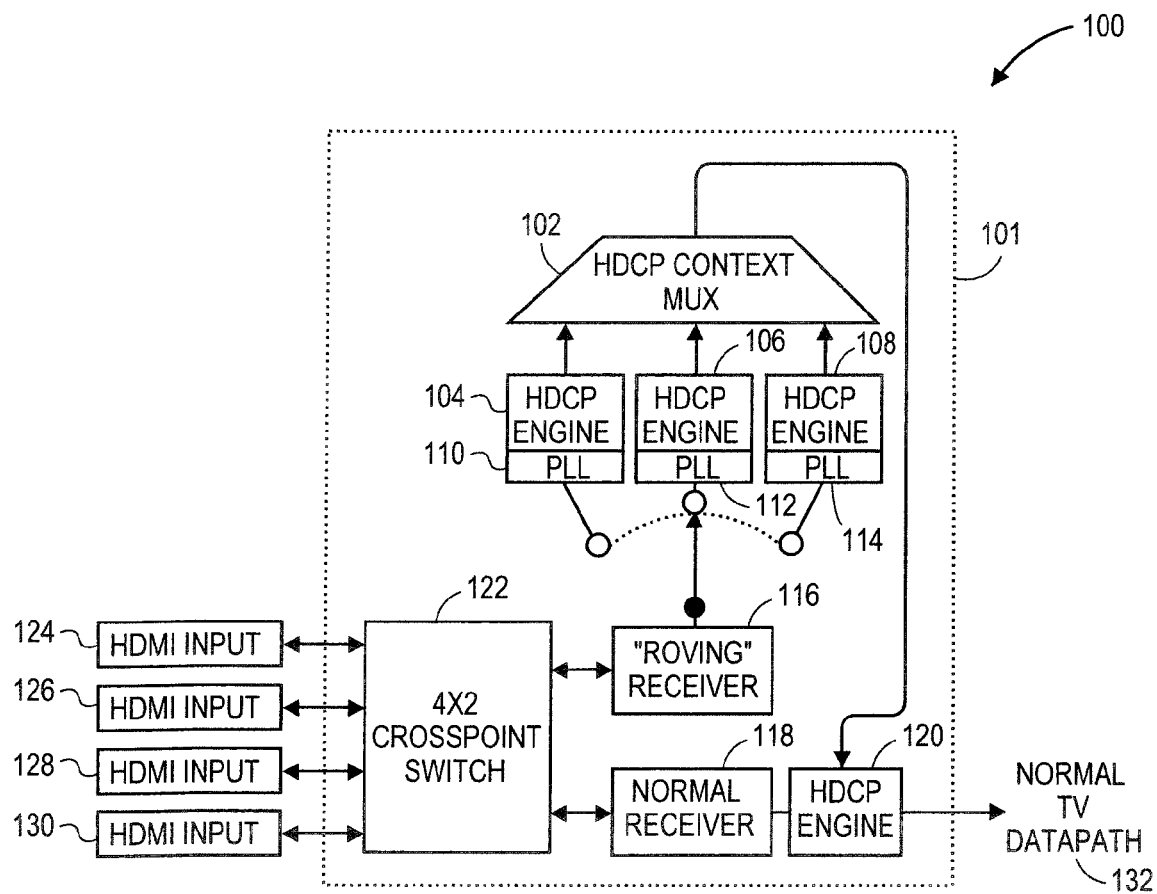
FIG. 1 illustrates a logical block diagram of an HDCP pre-authentication system.

Embodiments of the invention are generally directed to pre-authentication and keep-authentication of content protected ports system employing a ratio of one decipher processing engine (e.g., HDCP engine) associated with multiple ports is disclosed.

As used herein, "network" or "communication network" mean an interconnection network to deliver digital media content (including music, audio/video, gaming, photos, and others) between devices using any number of technologies, such as SATA, Frame Information Structure (FIS), etc. An entertainment network may include a personal entertainment network, such as a network in a household, a network in a business setting, or any other network of devices and/or components. A network includes a Local Area Network (LAN), Wide Area Network (WAN), Metropolitan Area Network (MAN), intranet, the Internet, etc. In a network, certain network devices may be a source of media content, such as a digital television tuner, cable set-top box, handheld device (e.g., personal device assistant (PDA)), video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions, such as s cable set-top box can serve as a receiver (receiving information from a cable head-end) as well as a transmitter (transmitting information to a TV) and vice versa. In some embodiments, the network devices may be co-located on a single local area network. In other embodiments, the network devices may span multiple network segments, such as through tunneling between local area networks. A network may also include multiple data encoding and encryption processes as well as identify verification processes, such as unique signature verification and unique ID comparison according to one embodiment.

In one embodiment, a pre-authentication and keep-authentication system of "n" content protected ports corresponding to "fewer than n" decipher processing engines is employed.

In content protection schemes, various tools (e.g., revocation lists) are used to detect, verify, and authenticate devices that communicate with each other. These devices include media devices, such a digital versatile disk or digital video disk (DVD) players, compact disk (CD) players, TVs, computers, etc. For example, a transmitting device (e.g., a DVD player) can use such tools to authenticate a receiving device (e.g., TV) to determine whether the receiving device is legal or eligible to receive premium protected media content from the transmitting device. Similarly, the receiving device authenticates the transmitting device prior to accepting the protected media content from it. To avoid too many of such authentication processes (that can be cumbersome, time consuming, and resource wasting), pre-authentication of devices is performed.

"Pre-Authentication" is a term used here to indicate a feature of devices, including HDMI switch products, to allow them to switch more quickly between inputs. The term describes the performance of necessary HDCP authentication before switching to the input, instead of after switching. In this way, the significant delays associated with authentication may be hidden in the background of operation, instead of the foreground.

Since HDCP receivers are considered slave devices, an HDCP receiver is not expected to explicitly signal a transmitter with any request or status. Even a "broken" link is typically signaled implicitly (and rather crudely) by intentionally "breaking" the Ri sequence (the response from Rx to Tx when Tx checks if the link is kept being synchronized securely). There are a wide variety of HDCP transmitters. Many of these may exhibit unique and quirky behaviors. Much of the delay that pre-authentication addresses is caused by these transmitter quirks, and not by the receiver. While, ideally, the transmitters would be modified to avoid these performance issues, realistically, this cannot be expected, and thus pre-authentication can provide significant value in data stream operations.

With regard to HDCP synchronization; in general, an HDCP receiver needs two things to stay synchronized with the transmitter: (1) the receiver knows where the frame boundaries are; and (2) the receiver knows which of these frames contains a signal that indicates that a frame is encrypted (e.g., CTL3). Throughout this document, "CTL3" is used as an example of encryption indicator without any limitation for the ease of explanation, brevity, and clarity.

FIG. 1 illustrates a logical block diagram of an HDCP pre-authentication system 100. The illustrated HDCP pre-authentication system 100 includes an HDCP (pre-authenticated) device 101 that include a dedicated HDCP engine block 104-108, 120 per input port. In general, the normal HDCP logic is used in every case, even when the open-loop ciphers do not do any decryption. This is because the re-keying functions use the HDCP logic to maximize dispersion. Further, an open-loop HDCP engine 104-108 uses a Phase Lock Loop (PLL) 110-114 or PLL-like circuit to lock onto the frame rate and provide ongoing information about where the frame boundaries are while running in the open-loop mode.

A single special purpose Transition Minimalized Differential Signaling (TMDS) receiver 116 (e.g., roving receiver) may be used to sequentially provide the essential information to the open-loop logic. This roving receiver 116 cycles through the currently unused inputs, finds the frame boundaries (so that the corresponding PLL 110-114 can lock on), and also finds the first CTL3 signal when an authentication occurs. In some cases, this could be a stripped-down version of a TMDS receiver 116 because in essence, it merely needs the VSYNC and CTL3 indicators.

Further, a normal TV data path 132 may work in the same manner as conventional switch products. In operation, one of the input ports can be selected for the normal data path 132, while the data stream is decoded and decrypted (e.g., decipher to take out original audio/video (A/V) data from the incoming encrypted data) as necessary, and then is routed through the remainder of the appliance.

The roving receiver 116 samples the currently idle ports, one at a time. This necessitates a state-machine or (more likely) a microcontroller of some kind to control the process. The initial operational sequence typically follows: (1) the roving receiver 116 is connected to an unused input port and monitors it for video; (2) the HDCP engine 104-108 is connected to the port as well, which means that the I$^2$C bus is connected (e.g., I$^2$C is regarded as an additional communication channel between Tx and Rx for link synchronization check). It may also mean signaling hotplug, to indicate to the source that it is ready for getting transmission and the HDCP authentication. This may also facilitate the transfer of Extended Display Identification Data (EDID) information, but this is beyond the scope of this disclosure; (3) when video is stable, the roving receiver 116 provides information to align the PLL with the frame boundaries; (4) the state machine or microcontroller waits a time period for the HDCP authentication to begin. If it does, it continues to wait until the authentication completes and the first CTL3 signal is received; (5) the HDCP block continues to cycle in an open-loop function counting "frames" using information only from the PLL. The I$^2$C port stays connected, and the hotplug signal continues to indicate that a receiver is connected; (6) the roving receiver 116 then continues on to the next port and performs the same operations. In some embodiments, once the roving receiver 116 has started all ports, it then goes into a service loop, checking each port in sequence.

Figure 2:
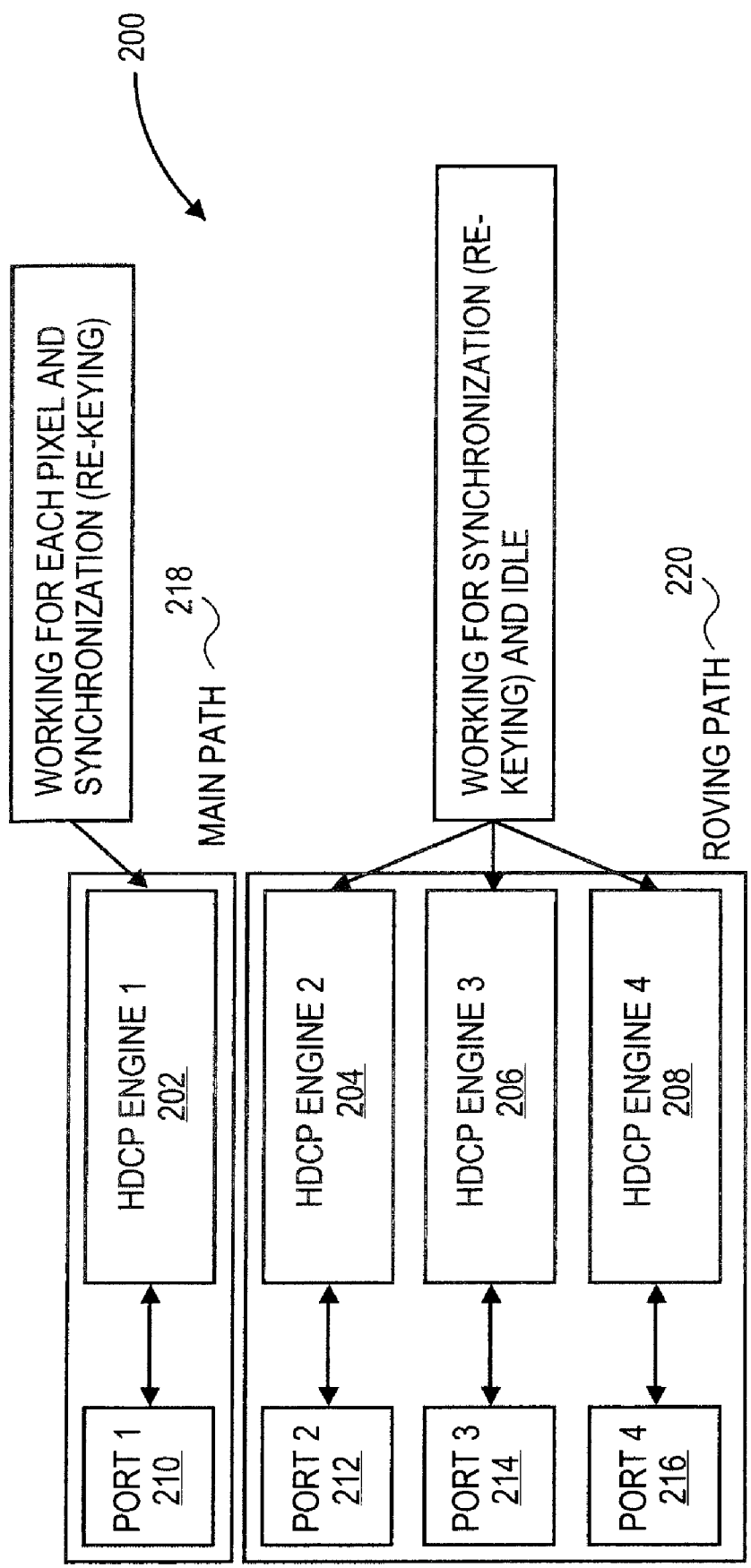
FIG. 2 illustrates an embodiment of an HDCP engine-to-port system employing a one-on-one ratio between the HDCP engines and the corresponding ports.

FIG. 2 illustrates an embodiment of an HDCP engine-to-port system 200 employing a one-on-one ratio between the HDCP engines 202-208 and the corresponding ports 210-216. The illustrated system 200 includes four HDCP engines 202-208 that corresponding to ports 210-216 in a one-on-one ratio, e.g., each HDCP engine 202-208 corresponds to a single port 210-216. The system 200 further illustrates port 1 210 as being in main pipe or path 218 and is associated with HDCP engine 1 202. Other paths 2-3 204-206 are in roving pipe or path 220 and are associated with HDCP engines 2-4 204-208. It is to be noted that the terms pipe and path are used interchangeably throughout this document. HDCP engine 202 of main path 218 works for each pixel (to decrypt and get the video and audio data) and synchronization (e.g., re-keying, which refers to at every frame boundary, Tx and Rx change the shared key used for cipher and decipher the contents. This is to prevent a key from being used for too many data. For example, at the $128^{th}$ frame, Tx and Rx exchange the residue of the key and check the synchronization of the link, called Ri checking in HDCP), while HDCP engines 204-208 of roving path 220 work for synchronization (e.g., re-keying) and idle.

HDCP engines 204-208 of roving path 220 work for a short period of time (e.g., performing the re-keying process) merely to synchronize Ri values that are used to make a transmitter (Tx) trust a receiver (Rx) is synchronized. However, in the system 200 when additional ports are employed, it requires additional corresponding HDCP engines, which can lead to a bigger and more burdensome system. In other words, HDCP engines 204-208 are only needed and are functioning during the synchronization period and the rest of the time period they become idle without any further use for the remainder of the time period while HDCP engine 202 continues to work.

Figure 3:
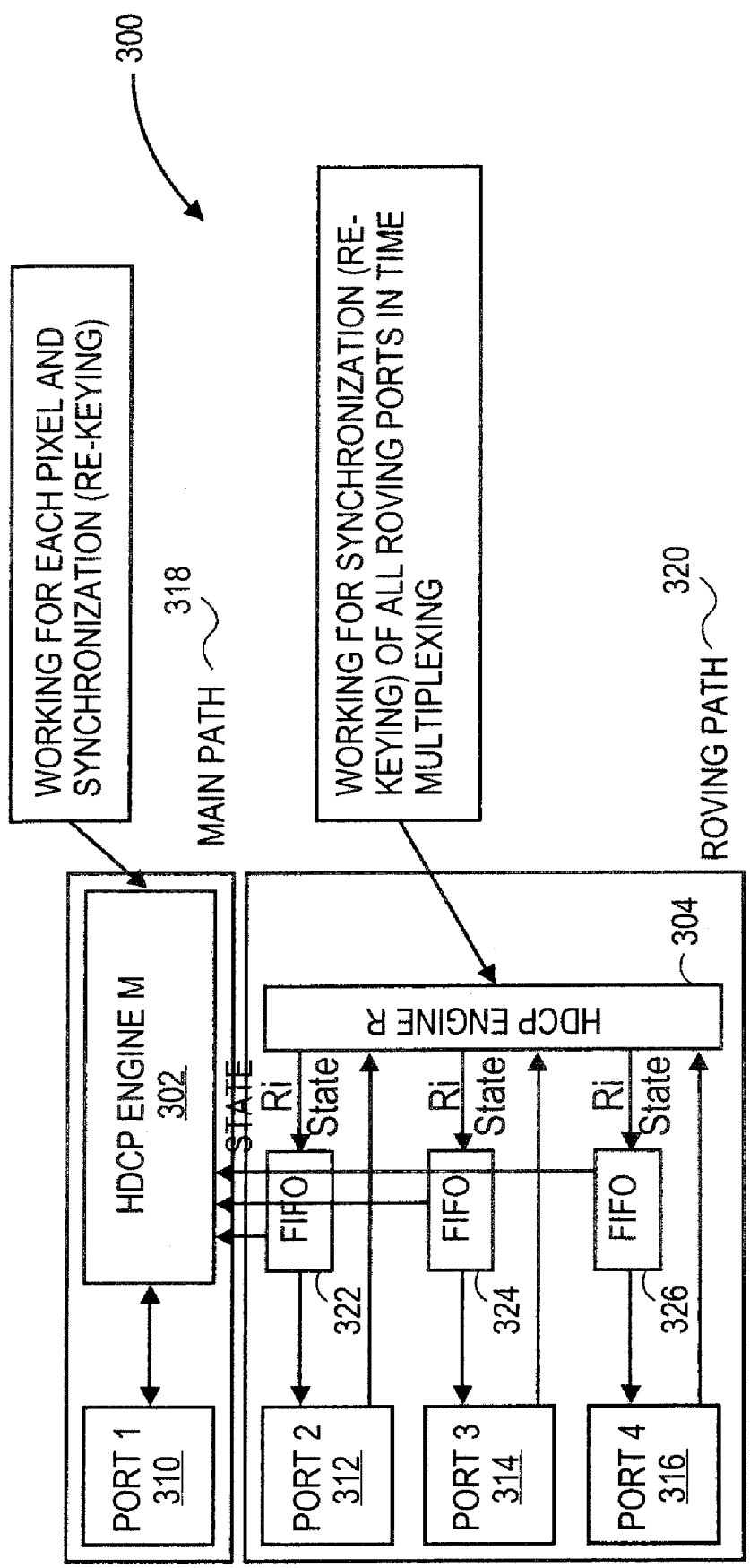
FIG. 3 illustrates an embodiment of a pre-authorization system having a reduced number of HDCP engines.

FIG. 3 illustrates an embodiment of a pre-authentication system 300 having a reduced number of HDCP engines 302, 304. Since most of the HDCP engines (e.g., the roving path HDCP engines of FIG. 1) work only for a short period of time, according to one embodiment, a reduced number of HDCP engines 302, 304 are employed in this system 300. Stated differently, in one embodiment, HDCP engine M 302 of main path 318 corresponds to port 1 310 and is the working engine that works for each pixel and synchronization (e.g., re-keying), while HDCP engine R 304 of roving path 320 corresponds to the rest of the ports 2-4 312-316 and works for synchronization (e.g., re-keying) for all roving ports 2-3 312-316 in time multiplexing.

The illustrated embodiment includes a time-based roving HDCP architecture having the pre-authentication system 300 employing two pipes or paths: main pipe 318 and roving pipe 320. The main pipe 318 is dedicated to the port 310 selected by a user to view the media content. On the other hand, roving pipe 320 roves other ports 312-316 (e.g., background ports) one by one in a time-based multiplexing fashion and to keep those ports 312-316 authenticated and synchronized with the corresponding transmitting device (Tx). Using this technique, multiple ports (e.g., four ports 310-316) can be used with two pipes 318, 320. A main pipe 318 refers to a pipe dedicated to the port 310 that a user selects to see media content (e.g., movie, sports, etc.). The main pipe 318 is, in general, composed of analog PLL, Serializer and Deserializer (SerDes), and other logics to recover the data (e.g., A/V data from the incoming bit stream). A roving pipe 320 refers to a pipe that roves multiple ports 312-316 that are not connected to the main pipe 318, but they stay ready to be used or called upon by the main pipe 318 if needed (e.g., when the user switches ports, such as switches the main port 310 for one of the roving ports 312-316). Generally, any structural components of the roving pipe 320 are the same as that of the main pipe 318.

An HDCP engine 302, 304 refers to a logic block that encrypts or decrypts the media content. For example, a transmitting device (Tx) may have an encryption (HDCP) engine, while a receiving device (Rx) may have a decryption (HDCP) engine. HDCP engines 302, 304 may be used to pre-authenticate and authenticate transmitting and receiving devices to establish a secure data link between Tx and Rx as well as keep track of synchronization between Tx and Rx over the secure link. For example, to verify synchronization, a transmitting device checks a receiving device with an Ri value at every 128 frames. The Ri value refers to a residual value of a shared key between Tx and Rx that is updated at every frame. A CTL3 signal refers to an indicator identifying whether the current frame is an encrypted frame. For example, Tx sends CTL3 for each frame it encrypts to let Rx know that it is an encrypted frame. It is contemplated that CTL3 is merely used here as an example for brevity and simplicity in explanation, but that other techniques may be employed to perform the same signaling tasks. An HDCP signal may include Vertical Sync (VS) and CTL3 (encryption indicator) in an incoming A/V stream for synchronization, while authentication and Ri checking are done through an I2C (DDC) bus.

In one embodiment, system 300 (e.g., employing InstaPort technology) provides for an "n" number of ports 310-316, but a "fewer than n" number of HDCP engines 302-304, saving valuable space and resources. As illustrated, for example, HDCP engine R 304 is shared by three ports 2-4 312-316 in a ratio of 1:3 which is three times better than a ratio of 1:1. The sharing of HDCP engine R 304 by multiple ports 3-4 312-316 eliminates the necessity to add an HDCP engine each time a port is added, which cumbersomely increases the system area and wastes resources. It is contemplated that any number of ports can be mapped to any number of HDCP engines and that the illustrated example provides a ratio of 1:3 only as an example and for brevity and clarity in understanding the disclosure.

In the illustrated embodiment, port 1 310 is designated as the main port and is associated with HDCP engine M 302 designated as the main engine to work for each pixel deciphering and to perform Ri synchronization (e.g., vertical re-keying). Ports 2-4 312-316 are designated as roving ports and are associated with HDCP engine R 304 to work for synchronization of all roving ports 2-4 312-316 in time multiplexing or in a time sharing way (and then becoming idle (without any use) for the remainder of the time period while HDCP engine 302 continues to work and perform).

For example, HDCP engine R 304 first works for roving port 2 312. After the R0 generation phase (which is the first phase of authentication to get the needed information to maintain the synchronization of the link, e.g., Ri generation) of port 2 312, HDCP engine R 304 pre-generates a number of Ri values (that are used for synchronization checking) for port 2 312 and puts them in First In First Out (FIFO) queue 322 associated with port 2 312. Port 2 312 then communicates with the FIFO queue 322 to have the queue 322 send out the needed Ri value that is requested by the Tx connected to port 2 312. Once Tx connected to port 2 312 receives the needed Ri value correctly from the corresponding FIFO queue 322, Tx comes to trust that the HDCP is synchronized and keeps going. At this point, HDCP engine R 304 moves on to the next port, e.g., port 3 314 and performs the same process for port 3 314 as previously with port 2 312, such as generating a number of Ri's for port 3 314 and putting them in a FIFO queue 324 corresponding to port 3 314. HDCP engine R 304 performs these operations again and again for each of the remaining ports, such as port 4 316, working with the corresponding FIFO queue, such as FIFO queue 326, to make sure the FIFO queues 322-326 are not empty. As long as the FIFO queues 322-326 have the Ri that Tx needs, the transmitting device may continue to authenticate the receiving device.

When HDCP engine R 304 stores pre-generated Ri values (e.g., vertical re-key result) to the FIFO queues 322-326, the states of HDCP engine R 304 (e.g., Mi values; internal states of HDCP engine) are also kept in the FIFO queues 322-326. This state information of HDCP engine R 304 relating to its corresponding ports 2-4 312-316 is then used by HDCP engine M 302 as a starting point of main pipe operation when the corresponding port is selected for a main pipe by user. HDCP engine M 302 is associated with the main port and it not only performs synchronization, but also the deciphering of pixel data at each cycle. When a port is selected as the main port, the states of HDCP engine R 304 for the selected port as a main (stored in one of FIFO 322-326) are copied to HDCP engine M 302 to transfer the status of synchronization of the selected port that were one of roving ports. Then, HDCP engine M 302 may start the operation for the selected port (such as horizontal re-key, decipher code generation, etc.) using the state information copied from the FIFO queues 322-326. The actual details of data transfer (e.g., Ri, status, etc.) may follow one of the conventional techniques.

When port 1 310 is removed as the main port, its status of HDCP engine M 302 is copied to a corresponding FIFO queue (e.g., in FIFO queue 326, if port 1 310 is then designated as the last roving port while the other three move up). Then, at a later point in time, when HDCP engine R 304 visits the former main port, port 1 310, in its roving operation, it copies the content of the FIFO queue (e.g., FIFO queue 326) and uses it as a starting point for the port 1 310 processing (now a roving port). This technique guarantees the seamless move-in and move-out between the main port and the roving ports for each port 310-316.

It is contemplated that although two HDCP engines 302, 304, four ports 310-316, three FIFO queues 322-326, etc., are illustrated here, any number of engines, ports, and FIFO queues can be employed depending on various requirements (e.g., time budget required not to empty the FIFO, FIFO vs. HDCP engine area, etc.) of a system. For example, the number of HDCP engines can be reduced to one engine, because even the main HDCP engine 302 will have some idle time during its work for the main port 310 and this idle time may be long enough for the main HDCP engine 302 to handle the process of the roving ports 312-316 in, for example, time multiplexing manner since the frequency of generating Ri is much lower compared to the operation frequency of HDCP engines. Further, HDCP engines are employed here as examples of content protection and decipher processing engines for the sake of consistency, brevity and clarity of this document. It is contemplated, however, that other forms of engines consistent with the HDCP technology can also be employed to perform the techniques and embodiments of the present invention.

FIG. 4 illustrates an embodiment of a transaction sequence of an authentication process 400. In one embodiment, the authentication process 400 includes timelines 450, 452, 454 indicating various phases 410, 412 of the authentication process 400. In one embodiment, timeline 450 illustrates the use of a roving engine (e.g., HDCP engine R 304) as illustrated with reference to FIG. 3. In timeline 450, during the first phase 410 of the authentication process 400, HDCP engine R is used and involved at all time. In the second phase 412, however, HDCP engine R is nearly idle except for small portions of time. These conditions of HDCP engine R are further described with reference to FIG. 3, which further provides, in one embodiment, reducing the number of HDCP engines R to a single HDCP engine R since an HDCP engine R is only occasionally used after the first phase 410 is concluded such that having multiple HDCP engines R sitting idle can be avoided. Similarly, in subsequent phases 414, 416, and so forth, HDCP engine R continues to authenticate the transmitter and/or receiver devices (as necessary) and keep checking the relevant R value (e.g., R1 406, R2 408, etc.), corresponding to other ports that are connected with HDCP engine R.

The illustrated phase intervals are indicated by R0 404, R1 406, R2 408, . . . Rn, each of which includes a 16-bit number that reflects a function of certain parameters than be calculated at the start of the second phase 412. For example, when a transmitter device successfully authenticates a receiver device, the number generated by an HDCP engine (R), shown as R0 404, R1 404, etc., indicates whether the transmitter and receiver devices are synchronized. In the illustrated embodiment, for example, the calculation for R1 406 is performed during the second phase 412 over a two second period.

Timelines 452 and 454 reflects the workings of a main engine (e.g., HDCP engine M 302) in the main path as illustrated with reference to FIG. 3. The first phase 456 shows the engine usage 464 that indicates the use of HDCP engine M 414 throughout the first phase 456 of the authentication process. Timeline 454 further illustrates the use of HDCP engine M for authenticating 466 the transmitter and/or receiver devices (e.g., checking the R values of R1, R2, R3, . . . Rn) during the subsequent phases 458, 460, 462 of the authentication process 400.

However, as timeline 454 indicates the work or use of HDCP engine M, as opposed to HDCP engine R, is not merely limited to continue to authenticate 466 the relevant devices, but rather it is further used for handing any relevant audio/video data in the main pipe 468. This audio/video data handling function 468 of HDCP engine M is illustrated as clouds during the subsequent phases 458-462 and continues thereafter. In one embodiment, in the main path (e.g., what the user watches and knows), HDCP engine M is dedicated for not only performing authentication of devices, but also for handing and processing of the relevant audio/video data. On the other hand, in the roving path (e.g., what the user does not watch or know because this path runs in the background), in one embodiment, a single HDCP engine R can be employed that is time multiplexed to perform its functions for multiple ports. Further, it is to be noted that an HDCP engine (R or M) may be connected to a physical port for performing various functions, such as the ones described here.

Figure 5A:
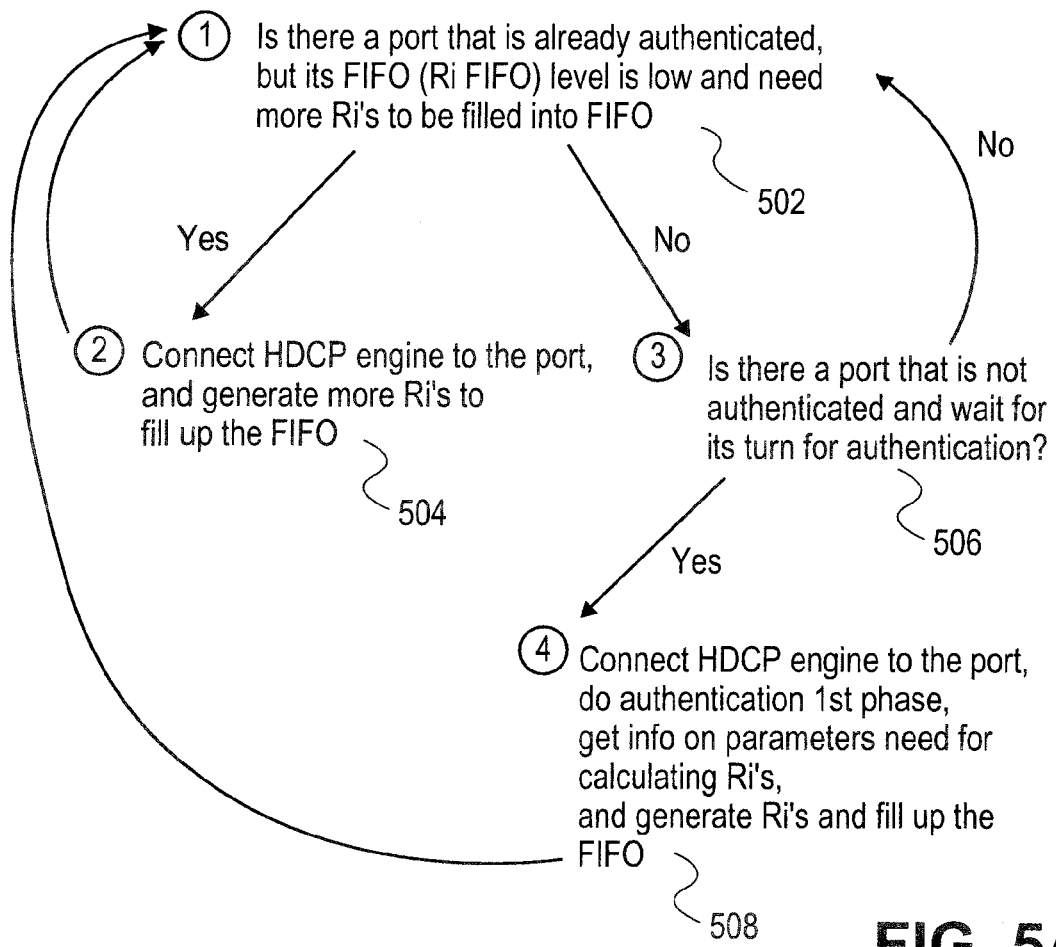
FIG. 5A illustrates an embodiment of a process for a main engine.

FIG. 5A illustrates an embodiment of a process for a roving engine. In one embodiment, a roving engine (e.g., HDCP engine R) is employed and connected to a number of ports and performs its functions in a roving path, the performance of which is not visible to the user. At decision sequence 502, a determination is made as to whether there is a port that is already authenticated, but its FIFO level (e.g., Ri FIFO) is low and needs additional Ri's to be filled into its corresponding FIFO. If there is such a port, HDCP engine R is connected to the port and more Ri's are generated to fill up the FIFO at processing sequence 504 and the process continues with decision sequence 502.

If there is not a port that is authenticated as per decision sequence 502, then at decision sequence 506, a determination is made as to whether there is a port that is not authenticated and is waiting for its turn to be authenticated. If there is not such a port, the process continues with decision sequence 502. If, however, there is a port that is not authenticated and is waiting for its turn to be authenticated as per decision sequence 502, then at processing sequence 508, HDCP engine R is connected to the port to perform the port authentication in the first phase (as illustrated with reference to FIG. 4). Also, HDCP engine R gets information on those parameters that are needed for calculating Ri's and then, it generates Ri's and fills up the corresponding FIFO. The process then continues with decision sequence 502.

Figure 5B:
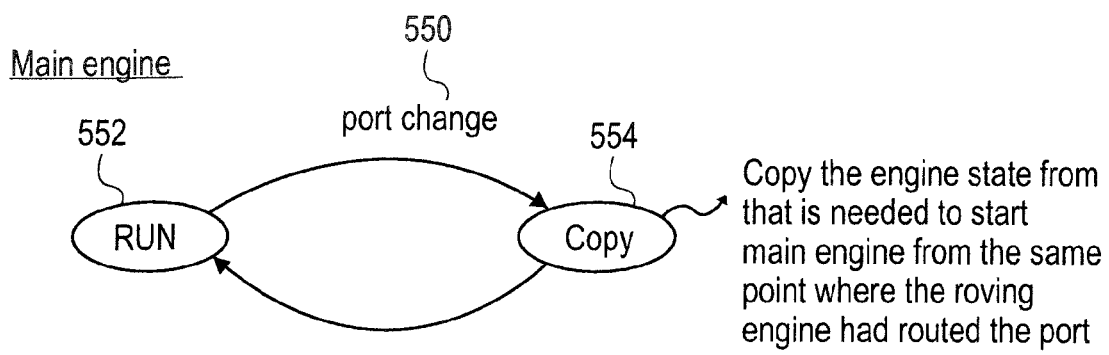
FIG. 5B illustrates an embodiment of a process for a main engine.

FIG. 5B illustrates an embodiment of a process for a main engine. A main engine (e.g., HDCP engine M) is connected to a port and runs 552 to perform its functions in the main path, the performance of which is visible to the user. When there is a changing of a port 550, HDCP engine M copies 554 the engine state information relating to the next port (e.g., the new port that is replacing the old port) from the FIFO that corresponds to the next port and contains the engine state information. This engine state information is needed by HDCP engine M to start back up, seamlessly, from the same point where the roving engine (e.g., HDCP engine R) stopped being associated with the next port and routed the port (which was previously a roving port associated and working with HDCP engine R) to continue the authentication process with now the new main port without a blemish. In addition to that, as explained before, the status of main engine M is copied to a FIFO corresponding to a roving port and it is used by the engine R next time when it visits the port.

Figure 6:
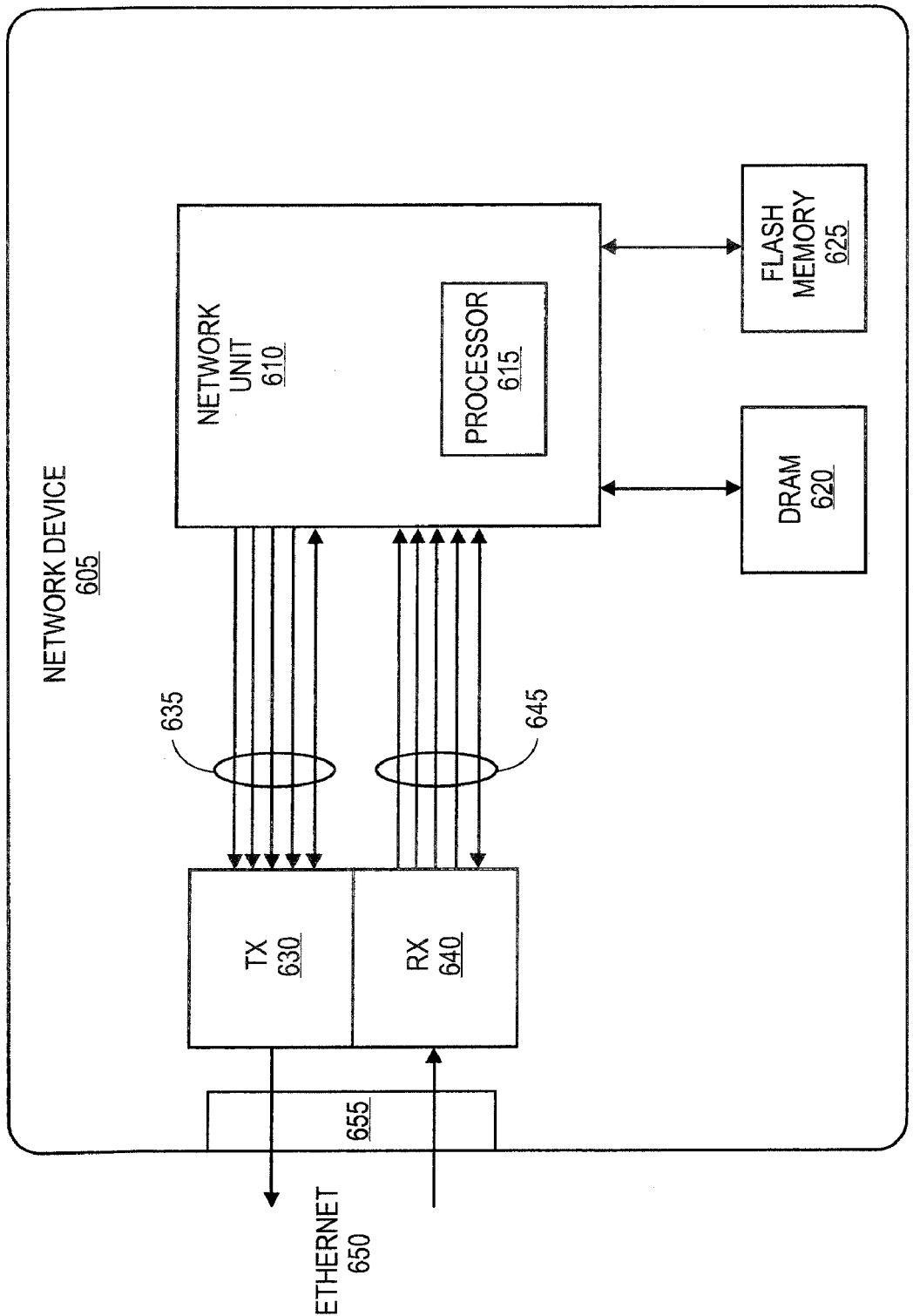
FIG. 6 is an illustration of embodiments of components of a network computer device employing an embodiment of the present invention.

FIG. 6 is an illustration of embodiments of components of a network computer device 605 employing an embodiment of the present invention. In this illustration, a network device 605 may be any device in a network, including, but not limited to, a television, a cable set-top box, a radio, a DVD player, a CD player, a smart phone, a storage unit, a game console, or other media device. In some embodiments, the network device 605 includes a network unit 610 to provide network functions. The network functions include, but are not limited to, the generation, transfer, storage, and reception of media content streams. The network unit 610 may be implemented as a single system on a chip (SoC) or as multiple components.

In some embodiments, the network unit 610 includes a processor for the processing of data. The processing of data may include the generation of media data streams, the manipulation of media data streams in transfer or storage, and the decrypting and decoding of media data streams for usage. The network device may also include memory to support network operations, such as DRAM (dynamic random access memory) 620 or other similar memory and flash memory 625 or other nonvolatile memory.

The network device 605 may also include a transmitter 630 and/or a receiver 640 for transmission of data on the network or the reception of data from the network, respectively, via one or more network interfaces 655. The transmitter 630 or receiver 640 may be connected to a wired transmission cable, including, for example, an Ethernet cable 650, a coaxial cable, or to a wireless unit. The transmitter 630 or receiver 640 may be coupled with one or more lines, such as lines 635 for data transmission and lines 645 for data reception, to the network unit 610 for data transfer and control signals. Additional connections may also be present. The network device 605 also may include numerous components for media operation of the device, which are not illustrated here.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

One or more modules, components, or elements described throughout this document, such as the ones shown within or associated with an embodiment of a port multiplier enhancement mechanism may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically EPROM (EEPROM), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
   pre-authenticating a receiving device by a transmitting device, wherein the receiving device receives a data stream from the transmitting device via a main data path;
   associating a main High-Definition Content Protection (HDCP) engine with a main port in the main data path, the main port serving as an active data port, wherein the main HDCP engine include a main decipher processing engine and is coupled to a roving HDCP engine; and
   associating the roving HDCP engine with a plurality of roving ports in a roving data path, each of the plurality of roving ports associated with a memory pipe having state information relating to each of the plurality of roving ports, the state information being used to pre-authenticate the receiving device and the plurality of roving ports such that each roving port serves as a pre-authenticated backup data port that is ready to replace the main port without having to be authenticated, wherein the roving HDCP engine includes a roving decipher processing engine.

2. The method of claim 1, further comprising generating the state information for each of the plurality of roving ports, and storing the state information in memory pipes, each memory pipe corresponding to a port of the plurality of roving ports.

3. The method of claim 1, further comprising synchronizing the plurality of roving ports in time multiplexing by the roving HDCP engine, wherein synchronizing includes vertical re-keying of the plurality of roving ports.

4. The method of claim 1, further comprising pixel deciphering of the main port by the main HDCP engine.

5. An apparatus comprising:
   a receiving device to be pre-authenticated by a transmitting device, wherein the receiving device receives a data stream from the transmitting device via a main data path;
   a main High-Definition Content Protection (HDCP) engine associated with a main port in the main data path, the main port serving as an active data port, wherein the main HDCP engine include a main decipher processing engine and is coupled to a roving HDCP engine; and
   the roving HDCP engine associated with a plurality of roving ports in a roving data path, each of the plurality of roving ports associated with a memory pipe having state information relating to each of the plurality of roving ports, the state information being used to pre-authenticate the receiving device and the plurality of roving ports such that each roving port serves as a pre-authenticated backup data port that is ready to replace the main port without having to be authenticated, wherein the roving HDCP engine includes a roving decipher processing engine.

6. The apparatus of claim 5, wherein the roving HDCP engine to generate the state information for each of the plurality of roving ports, and store the state information in memory pipes, each memory pipe corresponding to a port of the plurality of ports.

7. The apparatus of claim 5, wherein the roving HDCP engine to synchronize the plurality of roving ports in time multiplexing by the roving HDCP engine, wherein synchronizing includes vertical re-keying of the plurality of ports.

8. The apparatus of claim 5, wherein the main HDCP engine to pixel decipher of the main port by the main HDCP engine.

9. A system comprising:
   a pre-authenticating device to facilitate pre-authenticating of a receiving device by a transmitting device, wherein the receiving device receives a data stream from the transmitting device via a main data path, the pre-authenticating device includes:
   a main High-Definition Content Protection (HDCP) engine associated with a main port in the main data path, the main port serving as an active data port, wherein the main HDCP engine include a main decipher processing engine and is coupled to a roving HDCP engine; and
   the roving HDCP engine associated with a plurality of roving ports in a roving data path, each of the plurality of roving ports associated with a memory pipe having state information relating to each of the plurality of roving ports, the state information being used to pre-authenticate the receiving device and the plurality of roving ports such that each roving port serves as a pre-authenticated backup data port that is ready to replace the main port without having to be authenticated, wherein the roving HDCP engine includes a roving decipher processing engine.

10. The system of claim 9, wherein the roving HDCP engine to generate the state information for each of the plurality of roving ports, and store the state information in memory pipes, each memory pipe corresponding to a port of the plurality of ports.

11. The system of claim 9, wherein the roving HDCP engine to synchronize the plurality of roving ports in time multiplexing by the roving HDCP engine, wherein synchronizing includes vertical re-keying of the plurality of ports.

12. The system of claim 9, wherein the main HDCP engine to pixel decipher of the main port by the main HDCP engine.

* * * * *